US008485298B2

(12) United States Patent
Alexander

(10) Patent No.: US 8,485,298 B2
(45) Date of Patent: Jul. 16, 2013

(54) DISTRIBUTED POWER GENERATION SYSTEM FOR SURFACE TRANSPORT

(75) Inventor: Nic Alexander, Woollahra (AU)

(73) Assignee: Power Rail Road Pty Ltd, New South Wales (AU)

( * ) Notice: Subject to any disclaimer, the term of this patent is extended or adjusted under 35 U.S.C. 154(b) by 22 days.

(21) Appl. No.: 13/373,316

(22) Filed: Nov. 9, 2011

(65) Prior Publication Data

US 2012/0118654 A1 May 17, 2012

Related U.S. Application Data

(63) Continuation-in-part of application No. 12/998,154, filed as application No. PCT/AU2009/001268 on Sep. 24, 2009.

(51) Int. Cl.
*B60K 6/00* (2007.10)

(52) U.S. Cl.
USPC ....... 180/165; 180/65.3; 180/65.31; 303/152; 60/414

(58) Field of Classification Search
USPC .............. 180/2.1, 65.1, 65.21, 65.22, 65.285, 180/65.29, 65.31, 302, 310; 290/52, 54; 60/742, 60/801, 414; 126/400; 303/152
See application file for complete search history.

(56) References Cited

U.S. PATENT DOCUMENTS

| 3,771,311 | A | * | 11/1973 | Herbst | 60/709 |
|---|---|---|---|---|---|
| 3,986,575 | A | * | 10/1976 | Eggmann | 180/302 |
| 4,041,696 | A | * | 8/1977 | Morrison | 60/790 |
| 4,157,011 | A | * | 6/1979 | Liddle | 60/39.27 |
| 5,762,156 | A | * | 6/1998 | Bates et al. | 180/165 |
| 5,826,673 | A |  | 10/1998 | Bates et al. |  |
| 6,068,351 | A | * | 5/2000 | Martin-Gerez | 303/10 |
| 6,729,135 | B1 | * | 5/2004 | Norris et al. | 60/646 |
| 6,729,136 | B2 | * | 5/2004 | Dakhil | 60/650 |
| 6,815,840 | B1 | * | 11/2004 | Aldendeshe | 290/1 R |
| 8,109,357 | B1 | * | 2/2012 | Glover | 180/305 |
| 8,225,900 | B2 | * | 7/2012 | Domes | 180/302 |
| 2003/0228237 | A1 | * | 12/2003 | Holtzapple et al. | 418/171 |
| 2004/0124023 | A1 | * | 7/2004 | Plishner | 180/170 |
| 2004/0128975 | A1 | * | 7/2004 | Viteri | 60/39.55 |
| 2004/0237517 | A1 | * | 12/2004 | Cho et al. | 60/370 |
| 2010/0158702 | A1 | * | 6/2010 | Colavincenzo | 417/16 |
| 2012/0118654 | A1 | * | 5/2012 | Alexander | 180/65.21 |

FOREIGN PATENT DOCUMENTS

| DE | 3602545 | 7/1987 |
|---|---|---|
| FR | 2734318 | 11/1996 |
| GB | 223087 | 10/1924 |
| GB | 657035 | 9/1951 |
| WO | W09855335 | 12/1998 |

* cited by examiner

*Primary Examiner* — John Walters
*Assistant Examiner* — James Triggs
(74) *Attorney, Agent, or Firm* — Thomas J. Connelly; Wilhelm Law, S.C.

(57) ABSTRACT

A power generation system for a surface transport vehicle having at least two wheels. The power generation system includes a primary power generation device and a secondary power generation device. A connector attaches the secondary power generation device to at least two wheels of the surface transport vehicle. The power generation system also includes a power storage unit capable of storing energy received from either the primary or secondary power generation devices. Furthermore, the power generation system includes a torque converter which is capable of transferring power from the secondary power generation device to the power storage unit.

21 Claims, 4 Drawing Sheets

DISTRIBUTED POWER GENERATION SYSTEM FOR SURFACE TRANSPORT

FIELD OF THE INVENTION

The present invention relates to a power generation system for surface transport involving the movement of freight and/or passengers. In particular, the power generation system can store and generate power thereby reducing the amount of fossil fuels used by surface transport vehicles. The power generation system can also reduce the amount of fossil or nuclear fuels used for power generation. The power generation system can use a gas/steam generator which can be either surface mounted or integrated into a surface transport vehicle. The potential/kinetic energy of the surface transport vehicle can be used to generate power and this power can be transferred to and from a power storage unit either located on board the surface transport vehicle or located autonomously thereto.

BACKGROUND OF THE INVENTION

Surface transport has advantages such that it can deliver goods and services to any location without the need of major infrastructure. However, there is a need for surface transport vehicles to be more efficient in their use of fuel and energy consumption to ensure that they remain cost effective. Further, with the increasing concern of global warming, high demand for oil and geo-political issues, more efficient, clean power generation systems are desirable.

Accordingly, there is a need to reduce the fossil/nuclear fuel consumed per unit of freight for a surface transport vehicle. There is also a need to capture energy that is being lost from existing systems and/or the ability to transfer excess power between one or more surface transport vehicles and a power storage unit.

One such power generation system is to target a reduction in fuel and wasted energy lost in the stopping phase of a surface transport vehicle (i.e. the braking phrase) and to store/transmit excess energy at declines or descent and reuse this energy at inclines or when the surface transport vehicle is climbing up a hill or mountain.

OBJECT OF THE INVENTION

It is an object of the present invention to substantially overcome or at least ameliorate one or more of the disadvantages of the prior art, or to at least provide a useful alternative.

SUMMARY OF THE INVENTION

Briefly, this invention relates to a power generation system for a surface transport vehicle having at least two wheels. The power generation system includes a primary, gas/steam turbine, power generation device. The primary power generation device includes a compressor operable to receive a gas. A combustion chamber is located downstream from the compressor and is capable of receiving and igniting a fuel (liquid or gas) so as to heat the liquid in the first, second and third heat exchangers. The primary power generation device also includes a first gas turbine located downstream of the combustion chamber which receives the heated gas and generates energy for driving a first drive shaft connected to a generator. The heated gas exiting the first gas turbine is directed past the outside of the combustion chamber. The wall of the combustion chamber is the first liquid heat exchanger. The heated gas then passes through a second gas turbine which cooperates with the compressor. The heated gas exiting the second gas turbine is routed back to the combustion chamber. Excess gas exiting the power plant passes the second and third liquid heat exchangers and exhausts through the third turbine which co-operates with the first turbine.

Furthermore, the power generation system can use the heated liquid from the first, second and third liquid heat exchangers to drive a steam turbine. The steam turbine can be enclosed by the first heat exchanger and can be located co-axially within the combustion chamber. The power generation system also includes a secondary power generation device connected to the first drive shaft. The secondary power generation device includes an electrical generator/traction motor which is capable of driving at least two wheels of the surface transport vehicle and generating energy for storage on board and/or transmission to a power grid for storage and/or for use by other vehicles. The power generation system also includes a connector attached between the electrical generator/traction motor and the at least two wheels of the surface transport vehicle. The power generation system further includes a power storage unit capable of storing energy received from at least one of the primary power generation device and/or the secondary power generation device. The power storage unit can include a high energy fly wheel and/or hydro-mechanical device which can be used by the surface transport vehicle while moving to transmit energy to a power grid.

The power generation system further includes a torque converter connected between the power storage unit and the electrical generator/traction motor. The torque converter can vary in form. The torque converter can be a generator/traction motor, a gear box, axle/differential combination or a hydro-mechanical system. The power generation system is adapted to capture energy during a braking phase of the surface transport vehicle.

The power generation system can further include means for transferring excess energy to other surface transport vehicles from the power storage unit. The power storage unit can also transfer excess energy to a track or to a roadside power storage unit. The roadside power storage unit can include a hydro power storage tower and/or a hydro electrical power system using suitable terrain, reservoirs and piping and/or a fly wheel for energy storage.

BRIEF DESCRIPTION OF THE DRAWINGS

A preferred embodiment of the invention will now be described, by way of example only, with reference to the accompanying drawings, wherein.

DETAILED DESCRIPTION OF THE PREFERRED EMBODIMENTS

Figure 1:
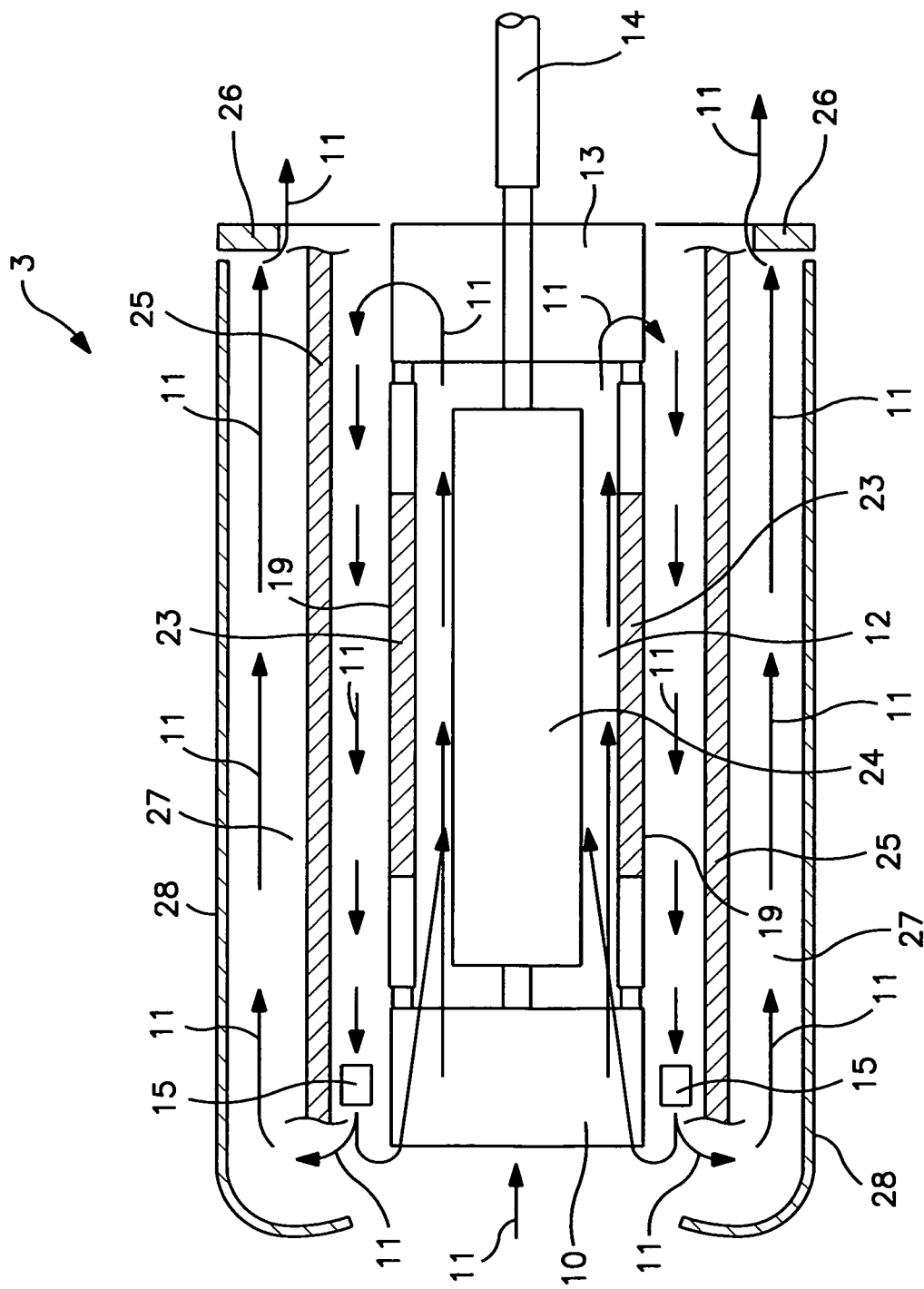
FIG. 1 is a distributed power generation system of an embodiment of the invention.
Figure 3:
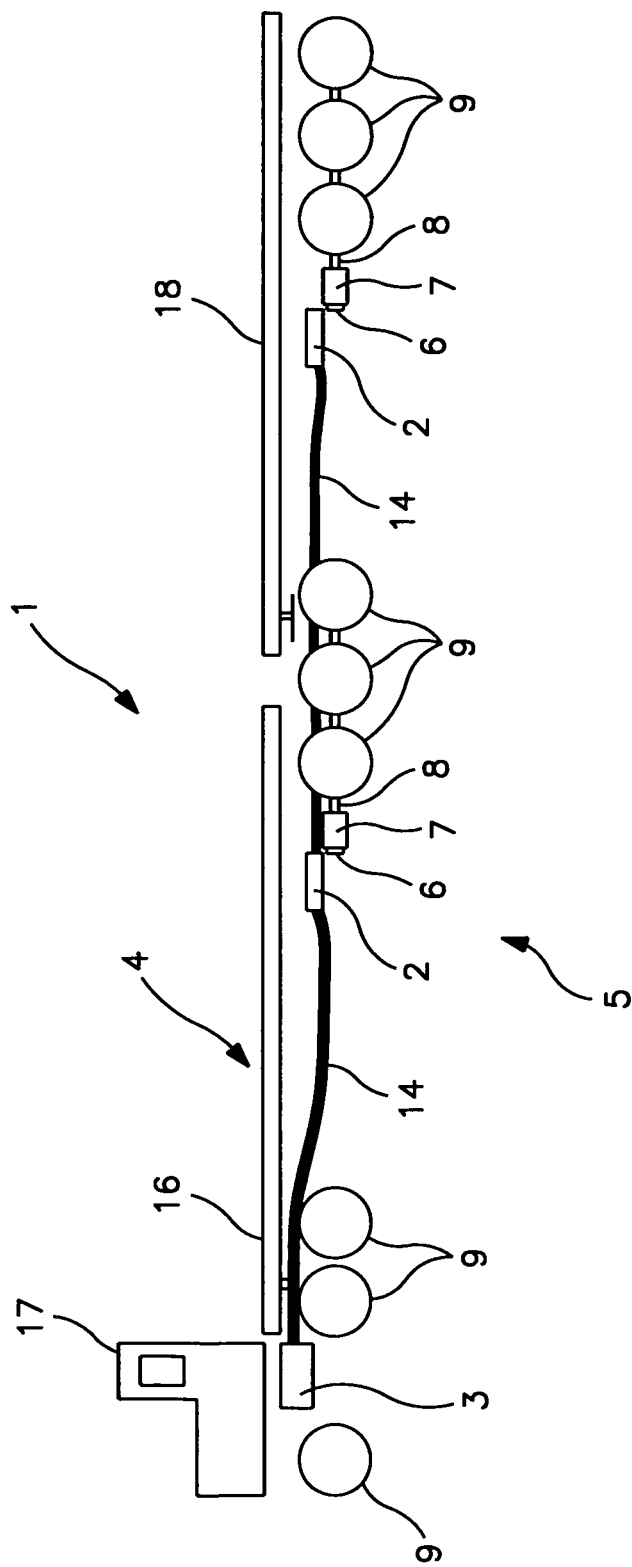
FIG. 3 shows one location of a distributed power generation device on a vehicle.

Referring to FIGS. 1 and 3, a power generation system 1 is shown for use on a surface transport vehicle 4 having at least two wheels 9. The surface transport vehicles 4 can be a car, a bus, a van, a truck, a truck body, a trailer cab, a tractor trailer, a flat bed trailer, a truck with a secondary trailer connected to it, a train, a diesel locomotive, a bullet train, an electric train, etc. The surface transport vehicle 4 can be a truck with multiple wheels 9, at least two of the wheels being drive wheels and at least two of the wheels 9 being braking wheels. Desirably, all of the wheels 9 can be drive and/or braking wheels. More desirably, at least two of the wheels 9 are both drive wheels and braking wheels. The power generation system 1 includes a primary power generation device 3 and a secondary power generating device 5. The power generation system 1 generates energy for the surface transport vehicle 4.

Figure 2:
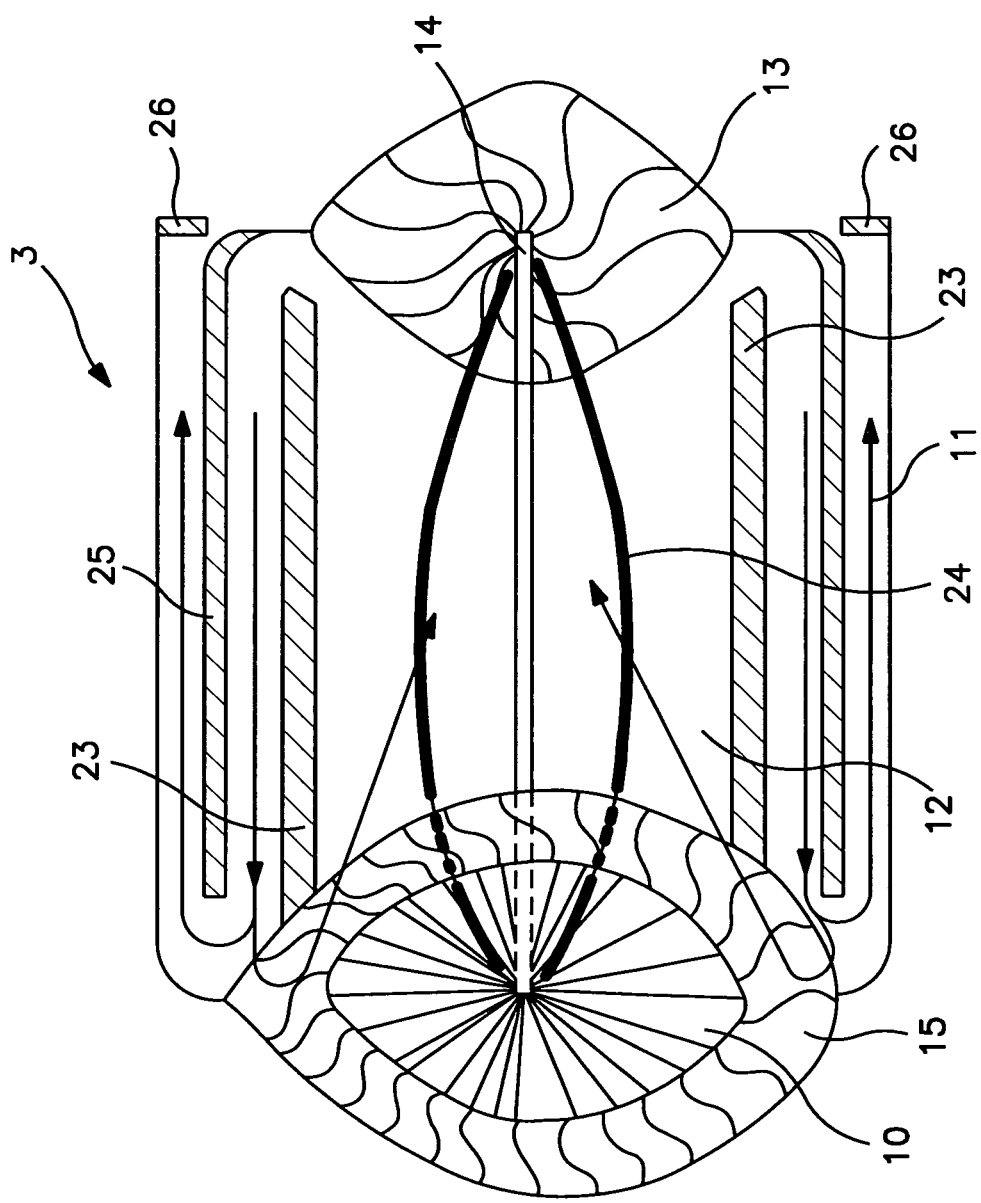
FIG. 2 is a distributed power generation system of a further embodiment of the invention.

Referring now to FIGS. 1 and 2, the primary power generating device 3 includes a combustion chamber 12. A steam turbine 24 can be located co-axially within the combustion chamber 12. The combustion chamber 12 is integrated with or at least partially surrounded by a first liquid heat exchanger 23. The primary power generating device 3 can be a thermally powered turbine device. The primary power generating device 3 can be a typical steam device. The secondary power generation device 5 (see FIG. 3) includes a torque converter 6 or some other mechanism that can transfer torque/energy such as: a high tension power cable, an axle/differential or a hydro-mechanical system. The torque converter 6 is capable of obtaining torque from at least two of the wheels 9, and preferably, from multiple wheels 9. The secondary power generation device 5 also includes an electrical generator/traction motor 7 in the axle/differential configuration or a generator/traction motor per axle, which can generate power in the power generation (stopping) phase of the surface transport vehicle 4. The secondary power generation device 5 can be a hydro-mechanical system or a differential system connected to a generator/traction motor.

The power from the primary power generation device 3 and/or from the secondary power generation device 5 can be stored on board the surface transport vehicle 4 in a power storage unit 2 for storage roadside or trackside. Alternatively, the power from the primary power generation device 3 and/or from the secondary power generation device 5 can be used in a power grid as demand requires. Furthermore, this power could be used by other identical or similar surface transport vehicles 4 in negotiating a gradient, in other words, such other surface transport vehicles 4 could use the power when going up an incline or hill. The surface transport vehicle 4 usually has multiple wheels 9. Two or more of the wheels 9 can deliver energy via a high tension power cable 14 and/or a connector 8 to the electrical generator/traction motor 7, to the power storage unit 2.

In FIG. 3, the surface transport vehicle 4 is depicted as a flat bed trailer 16 attached or connected to a truck cab 17. A secondary or rear trailer 18 is optionally attached or connected to the rear of the flat bed trailer 16. The first high tension power cable 14 from the primary power generation device 3 is connected to the secondary power generation device 5. The wheels 9 are driven by a differential, generator/traction motor or some other mechanism attached to the first high tension power cable 14. The secondary trailer 18 also has a high tension power cable 14 which connects another power storage unit 2 differential, generator/traction motor, or other mechanism or to the power storage unit 2 mounted to the flat bed trailer 16.

Referring again to FIGS. 1 and 2, the primary power generation device 3 includes a compressor 10 which operates on a fuel (liquid or gas). The direction of the gas/combusted fuel 11 as it passes through the primary power generation device 3 is shown by arrows. The primary power generation device 3 also has a combustion chamber 12 located downstream of the compressor 10 which receives a fuel (liquid or gas) and ignites the liquid so as to heat the gas 11. The heated gas 11 from the combustion chamber 12 is routed through a first gas turbine 13 in the form of a centrifugal turbine which is located downstream from the combustion chamber 12. The first gas turbine 13 is attached to a shaft 14 which rotates as the first gas turbine 13 turns. The heated gas 11 causes the first gas turbine 13 to rotate which in turn causes the shaft 14 to rotate. The hot exhaust gas 11 leaving or exiting the first gas turbine 13 can be routed back towards the combustion chamber 12. Optionally, some of the hot exhaust gas 11 can be vented to the atmosphere after passing the second turbine and routed past the second and third liquid heat exchanger 25 and 28, if desired. It is advantageous to route as much, if not all, of the exhaust gas 11 back towards the combustion chamber 12. This hot exhaust gas 11 can be directed past an outside wall 19 of the combustion chamber 12, through duck work, passageways, conduits or the like, to add or provide heat into the first liquid heat exchanger 23. The first liquid heat exchanger 23 can circumferentially surround at least a portion of the combustion chamber 12. The extra heat that is added back into the combustion chamber 12, via the first heat exchanger 23, can be used to heat the liquid used to operate the steam turbine 24.

The hot exhaust gas 11 exiting the first gas turbine 13 is routed through a second gas turbine 15 which is operatively associated with the compressor 10. The second axial flow gas turbine 15 is integrated as an outer ring on the compressor 10 and is capable of activating the compressor 10. The exhaust gas 11 leaving or exiting the second gas turbine 15 can be returned to the combustion chamber 12. Alternatively, the exhaust gas 11 from the second gas turbine 15 can be routed through a second and third liquid heat exchanger 25 and 28 and then through a passageway 27 to a third gas turbine 26. The passageway 27 is formed by the second 25 and third liquid heat exchanger 28. The third gas turbine 26 can operate in cooperation with the first gas turbine 13. The third axial flow gas turbine 26 can be mounted on or integrated with the first gas turbine 13.

Still referring to FIG. 1, the steam turbine 24 may be co-axially aligned with the first gas turbine 13 and can be located within the combustion chamber 12 such that it is surrounded by the first liquid heat exchanger 23. The steam turbine 24 can be aligned on the first drive shaft 14, if desired. Secondary effects of the reverse flow of the exhaust system and the first, second and third liquid heat exchangers, 23, 25 and 28 respectively, will lower turbine noise and reduce the temperature of the exhaust gas 11 to acceptable levels. A variable geometry air inlet and a variable geometry exhaust can be incorporated into the primary power generation device 3 to assist in optimizing the fuel/air mix and maximize energy transfer to the liquid heat exchangers 23, 25 and 28 which drives the steam turbine 24.

It should be understood that the power generation system 1 can work equally well on a prime mover, such as an engine, a locomotive, or on a load carrying device. The power generation system 1 can also be integrated into other parts of the surface transport vehicle 4, be mounted as a roadside unit, or be mounted trackside.

Figure 4:
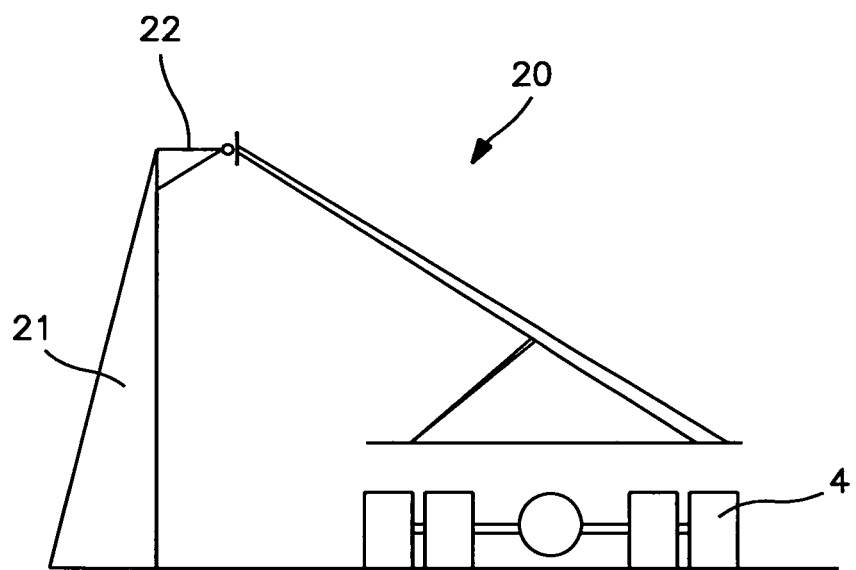
FIG. 4 shows a power transmission system.

Referring now to FIGS. 3 and 4, the power generation system 1 also includes a power storage unit 2 mounted roadside, trackside or on a surface transport vehicle 4. The power storage unit 2 can be used in a power grid as demand requires by other surface transport vehicles, for example, as when other surface transport vehicles 4 are negotiating a gradient or the like, see FIG. 4. Each surface transport vehicle 4 can have a power transmission system 20. The power transmission system 20 can include one or more towers 21 supporting an overhead power line 22, or the like. The power transmission system 20 is required to transmit the energy between various surface transport vehicles 4. An Energy Management Control Computer (EMC²™ not shown) would be used. This would include a global positioning system (GPS) and an elevation (potential energy) algorithm assessing the onboard power required at trip planning, the end of required power usage of a surface transport vehicle 4, or the power generation phases of a surface transport vehicle 4. That is, the surface transport vehicle 4 expends energy while travelling through a downhill phase and draws energy while travelling through an uphill phase. Semi-trailers and rolling stock (rail cars), or the like, will require a push algorithm to ensure the safety of the (truck/tractor/locomotor). This would constitute for road transport a slight flex in the draw pin measured by laser/light or a device which would dictate the amount of acceleration required by the trailer(s) to balance push/pull on the preceding surface transport vehicle 4, and for rail, the amount of push or pull depends on the phase of operation. Using the power generation system 1, where the steam turbine 24 is enclosed by the first liquid heat exchanger 23 or the like, power can also be generated. The combustion chamber 12 and the first liquid heat exchanger 23 in the reverse flow exhaust would have to produce sufficient heat to provide steam. The system EMC$^{2TM}$ sets a primary power plant burn start time and duration to generate sufficient energy to efficiently continue the journey, minimizing energy usage.

The power generation system 1 uses power generation, storage and power transmission. The generated energy can be measured and this amount can be sent to a Power Rail/Road (PRR™) location when the surface transport vehicle 4 is within telephone or cell range, or at power transmission zones via internet protocols. A power bill can be produced of the amount of energy generated and/or consumed. For example, the EMC$^{2TM}$ for a city transit vehicle, the power storage unit 2 is powered to a predetermined level to accelerate, for example, 100 t to 100 km/hr and retain 25% of the energy or power needs are optimized for the journey profile with inputs from EMC$^{2TM}$. Power storage units 2 will be an integral part of the power generation system 1 both in built up and in isolated areas.

The EMC$^{2TM}$ plots the planned course predicting and optimizing primary power generator burn times, relative to power transmission zones, and the optimum energy upload/download at power transmission zones. The EMC$^{2TM}$ would receive regular database updates for the most recent power transmission zone completion for journey planning to optimize routes and the EMC$^{2TM}$ saves previous routes and optimizes route power management profiles based on newly constructed power transmission zones (this information is updated wirelessly or by power transmission zones via Internet Protocol). The device will be capable of impulse (very high rate) power transmission at transmission zones. The power storage unit 2 may be a high energy fly wheel, a contra rotating high energy fly wheel, a fly wheel having magnetic bearings to reduce energy loss through friction, a hydro-mechanical or some other highly efficient/applicable power storage unit. A drive shaft/power take-off (PTO) from the vehicle engine and also the load carrying device, will generate electricity through a generator/traction motor. Power generation may be augmented by a torque converter 6 to ensure maximum energy capture transmitting this energy through an accumulator to a final drive to the power storage unit 2. Traction control on the wheels 9 will signal differential locks to maximize power generation (stopping phase) and acceleration. Integrated drive gear can be built into generator/traction motors to ensure optimum motor revolution over varying vehicle speeds. Vehicle accelerator and foot brake will demand a g-force acceleration/deceleration augmented by an acceleration/deceleration signal transferred to the power generator(s) to sequence the amount of energy required in the acceleration phase and the amount of power generation in the stopping phase. EMC$^{2TM}$ will transmit energy requirements (upload/download) at power transmission zones say every 200 kms on level transits and on both uphill and downhill transits. A fast deploying hydraulic/electrical Power Transmission Contact (PTC), see FIG. 4, to overhead or side transmission power lines 22, will facilitate a very fast rate of power transmission to and from the surface transport vehicle 4 and/or power storage unit 2. A road and/or vehicle light/radar distance measuring equipment can be used to position the Power Transmission Contact (PTC) for accurate power line targeting. A Power Transmission Contact (PTC) pressure sensor will be incorporated to assist in optimum power line/Power Transmission Contact (PTC) contact.

Preferably, the Energy Management Control Computer (EMC$^{2TM}$) includes a power management system. When energy is scheduled for storage in the power storage unit 2 and another entity also demands power, then the power on demand is directed to the device demanding the energy. If there is excess energy, then this excess energy is directed by the Energy Management System to storage in the power storage unit 2 and vice versa. The power storage unit 2 will include, but not be limited to, a) a fly wheel, b) a hydro power generation and storage system or c) a hydro-mechanical system. The fly wheel's power storage unit (PSU) may be a high energy fly wheel or a contra-rotating high energy fly wheel with various configurations of generator/traction motors, one to accept power through the drive and the other to generate power when demanded, and can include an integrated power management system. The hydro-electrical system will use the potential energy of water to store power, the challenge being to enhance the energy in-energy out equation to reduce inefficiencies and maximize the power generated compared to the energy stored.

The hydro power generation and storage unit may include: a constructed power storage tower, or use suitable terrain with reservoirs and piping between them and/or a fly wheel to provide sufficient power generation/storage as demand may require.

To achieve this, a Focused Turbine Drive Technology (FTDT™) system can be employed where injector nozzles are used to specifically target receptacles on the turbine drive shaft. The receptacles can be positioned to receive the injected water as the previous one rotates out of the injector flow.

The hydro power generation and energy storage device can include integrated dual axial flow generator/lift pumps to ensure efficient water flow/power storage. Suitable redundancy will be included in this system to enable efficient maintenance with minimal or no downtime.

Such a power generation system 1 would provide fuel savings per unit of payload on surface transport vehicles 4 and the storage and transmission of power, autonomous navigation by rail freight/passenger cars to the destination avoiding lengthy delays in switching yards.

Lower labor costs and the primary power generation turbines have only two primary moving parts, each compared to an internal combustion engine (ICE) thus resulting in lower maintenance costs and longer mean time between failures. Also, efficient primary power generation can be produced when utilizing the steam turbine 24. The gas turbine can use many different liquids or fuels with minimum adjustment. Hydrogen, a zero carbon emission fuel can also be used.

Although the invention has been described with reference to specific examples, it will be appreciated by those skilled in the art that the invention may be embodied in many other forms.

The invention claimed is:

1. A power generation system for a surface transport vehicle having at least two wheels, comprising:
   a) a primary gas/steam power generation device which includes a compressor operable to receive a fuel, a combustion chamber located downstream from said compressor which receives a fuel so as to ignite a fuel air mixture exiting said compressor, a first gas turbine located downstream of said combustion chamber which receives said heated gas and generates energy for driving said generator of said surface transport vehicle, said heated gas exiting said first gas turbine being directed past the outside of said combustion chamber to provide heat to a first, second and third liquid heat exchanger for heating said liquid to steam used in a steam turbine, said heated gas then passing through a second gas turbine which cooperates with said compressor, and said heated gas exiting said second gas turbine being routed primarily back into the said combustion chamber and/or routed past a second and a third liquid heat exchanger through a third gas turbine which cooperates with said first gas turbine;
   b) a secondary power generation device connected to said at least two wheels, said secondary power generation device including an electrical generator/traction motor which generates energy for driving said at least two wheels and/or generating energy for storage and/or transmission;
   c) a connector attached between said primary gas/steam power generation device and said electrical generator/traction motor;
   d) a power storage unit which stores energy received from at least one of said primary gas/steam power generation device and said secondary power generation device; and
   e) an electrical connector connected between said power storage unit and said electrical generator/traction motor which can transfer power from said electrical generator/traction motor, and said power generation system being adapted to capture energy during a braking phase of said at least two wheels of said surface transport vehicle for storage in preparation for transmission.

2. The power generation system of claim 1 wherein said power storage unit includes a high energy fly wheel which is used by said surface transport vehicle while in motion and can transmit energy to a power grid.

3. The power generation system of claim 1 further comprising a torque converting mechanism.

4. The power generation system of claim 3 wherein said torque converting mechanism is a hydro-mechanical torque converting system or a high tension power cable.

5. The power generation system of claim 1 wherein said power storage unit obtains input from said primary gas/steam power generation power plant and from said secondary power generation system.

6. The power generation system of claim 5 further comprising a first drive shaft connected to said at least two wheels, and said first drive shaft includes a differential.

7. The power generation system of claim 1 wherein said combustion chamber includes a steam turbine, and heat from said first, second and third liquid heat exchangers is used to heat liquid to steam which is used to drive said steam turbine.

8. The power generation system of claim 1 wherein said heated gas exiting said second gas turbine is routed through at least one of said second and third liquid heat exchangers.

9. The power generation system of claim 1 wherein said third gas turbine is mounted on said first gas turbine.

10. A power generation system for a surface transport vehicle having at least two wheels, comprising:
    a) a primary gas/steam power generation device which includes a compressor operable to receive a gas, a combustion chamber located downstream from said compressor which receives a fuel so as to ignite a fuel air mixture exiting said compressor, a first gas turbine located downstream of said combustion chamber which receives said combustion gas and generates energy for driving a generator to drive said at least two wheels, said heated gas exiting said first gas turbine being directed past the outside of said combustion chamber to provide heat to a first, second and third liquid heat exchanger for heating said liquid to steam used in a steam turbine, said heated gas then passing through a second gas turbine which cooperates with said compressor, and said heated gas exiting said second gas turbine being routed primarily back into said combustion chamber and/or routed past a second and a third liquid heat exchanger through a third gas turbine which cooperates with said first gas turbine;
    b) a secondary power generation device which includes an electrical generator/traction motor which generates energy for driving said at least two wheels;
    c) a connector attached between said electrical generator/traction motor and said at least two wheels;
    d) a power storage unit which stores energy received from at least one of said primary gas/steam power generation device and said secondary power generation device; and
    e) a torque converting mechanism connected between said power storage unit and said electrical generator/traction motor which transfers power from said electrical generator/traction motor, said torque converting mechanism being a high tension power cable, and said power generation system being adapted to capture energy during a braking phase of said at least two wheels.

11. The power generation system of claim 10 wherein said combustion chamber includes a steam turbine, and heat from said first, second and third heat exchangers is used to heat liquid to steam which is then used to drive said steam turbine.

12. The power generation system of claim 11 wherein said steam turbine is enclosed by said first heat exchanger and is located co-axially within said combustion chamber.

13. The power generation system of claim 10 further comprising means for transferring excess energy from said power storage unit to other surface transport vehicles.

14. The power generation system of claim 10 further comprising means for transferring excess energy from said power storage unit to a trackside power storage unit.

15. The power generation system of claim 10 further comprising means for transferring excess energy from said power storage unit to a roadside power storage unit.

16. The power generation system of claim 15 wherein said roadside power storage unit includes a fly wheel.

17. The power generation system of claim 15 wherein said roadside power storage unit includes a hydro power storage tower.

18. The power generation system of claim 15 wherein said roadside power storage unit includes a hydro electrical power system using suitable terrain, reservoirs and piping for energy storage.

19. A power generation system for a surface transport vehicle having at least two wheels, comprising:
    a) a primary gas/steam power generation device which includes a compressor operable to receive a gas, a combustion chamber located downstream from said compressor which receives a fuel so as to heat said gas exiting said compressor, a first gas turbine located downstream of said combustion chamber which receives said heated gas and generates energy for driving a first drive shaft connected to said at least two wheels, said heated gas exiting said first gas turbine being directed past an outside of said combustion chamber to provide heat to a first, second and third liquid heat exchangers for heating said liquid to steam used to drive a steam turbine, said heated gas then passing through a second gas turbine which cooperates with said compressor, and said heated gas exiting said second gas turbine being routed through a third gas turbine which cooperates with said first gas turbine;

b) a secondary power generation device which includes an electrical generator/traction motor which generates energy for driving said at least two wheels;

c) a connector attached between said electrical generator/action motor and said at least two wheels;

d) a power storage unit which stores energy received from at least one of said primary power generation device and said secondary power generation device; and e) a torque converter connected between said power storage unit and said electrical generator/traction motor, said torque converter transfers torque from said electrical generator/traction motor, said torque converter being a gear box, and said power generation system being adapted to capture energy during a braking phase of said at least two wheels.

20. The power generation system of claim 18 wherein said surface transport vehicle is a truck which contains multiple wheels, and at least two of said wheels are both drive wheels and braking wheels.

21. The power generation system of claim 18 further comprising means for transferring excess energy from said power storage unit to a roadside power storage unit, and said roadside power storage unit includes a high energy fly wheel.

* * * * *